US011788761B2

(12) United States Patent
Goel et al.

(10) Patent No.: US 11,788,761 B2
(45) Date of Patent: *Oct. 17, 2023

(54) METHOD AND SYSTEM FOR SUPPLY-AIR RE-CIRCULATION (71) Applicant: Lennox Industries Inc., Richardson, TX (US)

(72) Inventors: Rakesh Goel, Irving, TX (US); Eric Perez, Hickory Creek, TX (US)

(73) Assignee: Lennox Industries Inc., Richardson, TX (US)

( * ) Notice: Subject to any disclaimer, the term of this patent is extended or adjusted under 35 U.S.C. 154(b) by 328 days.

This patent is subject to a terminal disclaimer.

(21) Appl. No.: 17/181,050

(22) Filed: Feb. 22, 2021

(65) Prior Publication Data

US 2021/0172642 A1 Jun. 10, 2021

Related U.S. Application Data (63) Continuation of application No. 16/208,880, filed on Dec. 4, 2018, now Pat. No. 10,955,165.

(51) Int. Cl.
*F24F 12/00* (2006.01)
*F24F 11/30* (2018.01)
(Continued)

(52) U.S. Cl.
CPC ............ *F24F 12/006* (2013.01); *F24F 11/30* (2018.01); *F24F 2110/10* (2018.01);
(Continued)

(58) Field of Classification Search
CPC .. F24F 11/30; F24F 11/79; F24F 11/64; F24F 11/77; F24F 11/86; F24F 2110/10;
(Continued)

(56) References Cited

U.S. PATENT DOCUMENTS 4,487,363 A 12/1984 Parker et al.
4,732,318 A 3/1988 Osheroff
(Continued)

FOREIGN PATENT DOCUMENTS

CN 104254741 A 12/2014
WO WO-2018068879 A1 4/2018

OTHER PUBLICATIONS

U.S. Appl. No. 16/208,858, Goel.
U.S. Appl. No. 16/208,880, Goel.

*Primary Examiner* — Nelson J Nieves
(74) *Attorney, Agent, or Firm* — Bradley Arant Boult Cummings (57) ABSTRACT An HVAC system includes an evaporator coil disposed between a supply air duct and a return air duct. A re-circulation duct fluidly couples the supply air duct and the return air duct. A damper is disposed in the re-circulation duct and is moveable between an open position and a closed position. A controller is operatively coupled to a variable-speed compressor, a variable-speed circulation fan, and the damper. Responsive to a determination that the variable-speed circulation fan is operating at the minimum speed and the suction pressure is above the pre-determined threshold, the controller signals the damper to move to the open position. Responsive to a determination that the variable-speed circulation fan is not operating at the minimum speed or the suction pressure is below the pre-determined threshold, the controller signals the damper to move to the closed position.

20 Claims, 8 Drawing Sheets (51) Int. Cl.
    *F24F 110/40*  (2018.01)
    *F24F 110/20*  (2018.01)
    *F24F 110/30*  (2018.01)
    *F24F 110/10*  (2018.01)

(52) U.S. Cl.
    CPC ....... *F24F 2110/20* (2018.01); *F24F 2110/30* (2018.01); *F24F 2110/40* (2018.01)

(58) Field of Classification Search
    CPC ............... F24F 2110/20; F24F 2110/30; F24F 2110/40; F24F 2140/40
    See application file for complete search history.

(56) References Cited

U.S. PATENT DOCUMENTS

| | | | |
|---|---|---|---|
| 4,829,447 A | 5/1989 | Parker et al. | |
| 4,841,733 A | 6/1989 | Dussault et al. | |
| 5,249,596 A | 10/1993 | Hickenlooper, III et al. | |
| 5,292,280 A | 3/1994 | Janu et al. | |
| 6,997,390 B2 | 2/2006 | Alles | |
| 7,178,545 B2 | 2/2007 | Zelczer et al. | |
| 8,915,295 B2 | 12/2014 | Norrell et al. | |
| 8,955,232 B2 * | 2/2015 | Cunningham | D06F 58/22 34/140 |
| 10,119,721 B2 * | 11/2018 | Marak | F24F 13/0209 |
| 10,677,489 B2 | 6/2020 | Puranen et al. | |
| 10,697,683 B2 | 6/2020 | Sun et al. | |
| 2002/0072322 A1 | 6/2002 | Sharp et al. | |
| 2004/0072535 A1 | 4/2004 | Schneider et al. | |
| 2011/0067851 A1 | 3/2011 | Terlson et al. | |
| 2011/0300789 A1 | 12/2011 | Kinoshita et al. | |
| 2015/0075373 A1 | 3/2015 | Miller | |
| 2017/0023269 A1 | 1/2017 | Gevelber | |
| 2017/0089628 A1 | 3/2017 | Jang et al. | |
| 2017/0234564 A1 | 8/2017 | Goel et al. | |
| 2018/0104151 A1 | 4/2018 | Bengard | |
| 2018/0112886 A1 | 4/2018 | Boody | |
| 2018/0224136 A1 | 8/2018 | Goel | |
| 2018/0267515 A1 | 9/2018 | House et al. | |
| 2018/0327098 A1 | 11/2018 | Helin | |
| 2019/0032945 A1 | 1/2019 | Willmott et al. | |
| 2019/0041077 A1 | 2/2019 | Salsbury et al. | |
| 2019/0195528 A1 | 6/2019 | Puranen et al. | |

* cited by examiner

METHOD AND SYSTEM FOR SUPPLY-AIR RE-CIRCULATION

CROSS-REFERENCE TO RELATED APPLICATIONS

This application is a continuation of U.S. patent application Ser. No. 16/208,880, filed on Dec. 4, 2018. U.S. patent application Ser. No. 16/208,880 incorporates by reference U.S. patent application Ser. No. 16/208,858, filed on Dec. 4, 2018. U.S. patent application Ser. No. 16/208,880 and U.S. patent application Ser. No. 16/208,858 are incorporated herein by reference.

TECHNICAL FIELD

The present disclosure relates generally to heating, ventilation, and air conditioning (HVAC) systems and more particularly, but not by way of limitation, to utilizing a re-circulation duct to maximize latent capacity of an HVAC system at low circulation fan speeds.

BACKGROUND

This section provides background information to facilitate a better understanding of the various aspects of the disclosure. It should be understood that the statements in this section of this document are to be read in this light, and not as admissions of prior art.

HVAC systems are used to regulate environmental conditions within an enclosed space. Typically, HVAC systems have a circulation fan that pulls air from the enclosed space through ducts and pushes the air back into the enclosed space through additional ducts after conditioning the air (e.g., heating, cooling, humidifying, or dehumidifying the air). To direct operation of the circulation fan and other components, HVAC systems include a controller. In addition to directing operation of the HVAC system, the controller may be used to monitor various components, (i.e. equipment) of the HVAC system to determine if the components are functioning properly.

SUMMARY

Various aspects of the disclosure relate to a heating, ventilation, and air conditioning (HVAC) system. The HVAC system includes an evaporator coil disposed between a supply air duct and a return air duct. A re-circulation duct fluidly couples the supply air duct and the return air duct. A damper is disposed in the re-circulation duct and is moveable between an open position and a closed position. A controller is operatively coupled to a variable-speed compressor, a variable-speed circulation fan, and the damper. A pressure sensor is disposed in a suction line between the evaporator coil and the variable-speed compressor. The pressure sensor is configured to measure a refrigerant pressure in the suction line. The controller is configured to determine if the variable-speed circulation fan is operating at a minimum speed and if a suction pressure measured by the pressure sensor is above a pre-determined threshold. Responsive to a determination that the variable-speed circulation fan is operating at the minimum speed and the suction pressure is above the pre-determined threshold, the controller signals the damper to move to the open position. Responsive to a determination that the variable-speed circulation fan is not operating at the minimum speed or the suction pressure is below the pre-determined threshold, the controller signals the damper to move to the closed position.

Various aspects of the disclosure relate to a heating, ventilation, and air conditioning (HVAC) system. The HVAC system includes an evaporator coil disposed between a supply air duct and a return air duct. A re-circulation duct fluidly couples the supply air duct and the return air duct. A damper is disposed in the re-circulation duct and is moveable between an open position and a closed position. A controller is operatively coupled to a variable-speed compressor, a variable-speed circulation fan, and the damper. A temperature sensor is disposed in the supply air duct and is configured to measure a temperature of air in the supply air duct. The controller is configured to determine if the variable-speed circulation fan is operating at a minimum speed and if the temperature of air in the supply air duct is above a pre-determined threshold. Responsive to a determination that the variable-speed circulation fan is operating at the minimum speed and the temperature of air in the supply air duct is above the pre-determined threshold, the controller signals the damper to move to the open position. Responsive to a determination that the variable-speed circulation fan is not operating at the minimum speed or the temperature of air in the supply air duct is below the pre-determined threshold, signaling the damper to move to the closed position.

Various aspects of the disclosure relate to a method of utilizing a re-circulation duct. The method includes determining with an HVAC controller if a variable-speed circulation fan is operating at a minimum speed and monitoring an operating parameter of an HVAC system. In various embodiments, the method includes determining if the operating parameter of the HVAC system exceeds a pre-determined threshold. Responsive to a determination by the HVAC controller that the variable-speed circulation fan is operating at the minimum speed and the operating parameter exceeds the pre-determined threshold a damper disposed in a re-circulation duct that fluidly couples a supply air duct and a return air duct is signaled with the HVAC controller to move to an open position.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Various embodiments will now be described more fully with reference to the accompanying drawings. The disclosure may, however, be embodied in many different forms and should not be construed as limited to the embodiments set forth herein.

HVAC systems are frequently utilized to adjust both temperature of conditioned air as well as relative humidity of the conditioned air. A cooling capacity of an HVAC system is a combination of the HVAC system's sensible cooling capacity and latent cooling capacity. Sensible cooling capacity refers to an ability of the HVAC system to remove sensible heat from conditioned air. Latent cooling capacity refers to an ability of the HVAC system to remove latent heat from conditioned air. In a typical embodiment, sensible cooling capacity and latent cooling capacity vary with environmental conditions. Sensible heat refers to heat that, when added to or removed from the conditioned air, results in a temperature change of the conditioned air. Latent heat refers to heat that, when added to or removed from the conditioned air, results in a phase change of, for example, water within the conditioned air. Sensible-to-total ratio ("S/T ratio") is a ratio of sensible heat to total heat (sensible heat+latent heat). The lower the S/T ratio, the higher the latent cooling capacity of the HVAC system for given environmental conditions.

Sensible cooling load refers to an amount of heat that must be removed from the enclosed space to accomplish a desired temperature change of the air within the enclosed space. The sensible cooling load is reflected by a temperature within the enclosed space as read on a dry-bulb thermometer. Latent cooling load refers to an amount of heat that must be removed from the enclosed space to accomplish a desired change in humidity of the air within the enclosed space. The latent cooling load is reflected by a temperature within the enclosed space as read on a wet-bulb thermometer. Setpoint or temperature setpoint refers to a target temperature setting of the HVAC system as set by a user or automatically based on a pre-defined schedule.

When there is a high sensible cooling load such as, for example, when outside-air temperature is significantly warmer than an inside-air temperature setpoint, the HVAC system will continue to operate in an effort to effectively cool and dehumidify the conditioned air. When there is a low sensible cooling load but high relative humidity such as, for example, when the outside air temperature is relatively close to the inside air temperature setpoint, but the outside air is considerably more humid than the inside air, supplemental air dehumidification is often undertaken to avoid occupant discomfort.

An existing approach to air dehumidification involves lowering the temperature setpoint of the HVAC system. This approach causes the HVAC system to operate for longer periods of time than if the temperature setpoint of the HVAC system were set to a higher temperature. This approach serves to reduce both the temperature and humidity of the conditioned air. However, this approach results in over-cooling of the conditioned air, which over-cooling often results in occupant discomfort. Additionally, consequent extended run times cause the HVAC system to consume more energy, which leads to higher utility costs. Another air dehumidification approach involves re-heating of air leaving an evaporator coil.

In HVAC systems having a variable-speed compressor, the compressor speed may be modulated with the cooling load. In an effort to maintain a desirable S/T ratio, a speed of an indoor circulation fan may also be adjusted with the compressor speed. When the HVAC system is operating in the cooling mode, the speed of the indoor circulation fan is adjusted such that there is approximately 400 cubic feet per minute ("CFM") per actual ton of cooling. When the HVAC system is operating in the dehumidification mode, the speed of the indoor circulation fan is adjusted such that there is approximately 200 CFM per actual ton of cooling. As used herein, "actual ton" refers to an actual operating compressor tonnage. For example, in a two-compressor system having a 3-Ton compressor and a 5-Ton compressor, the actual tonnage is 3 Tons during periods when only the 3-Ton compressor is operating. If the CFM per actual ton ratio is too high, the S/T ratio rises and limits the ability of the HVAC system to remove humidity from the enclosed space. In practice, however, this can be difficult to accomplish as mechanical limitations of the indoor circulation fan establish a minimum possible CFM. Additionally, very low CFM results in poor air distribution within the enclosed space. In various embodiments, a minimum rated speed of the indoor circulation fan is established by a manufacturer of the indoor circulation fan.

Figure 1:
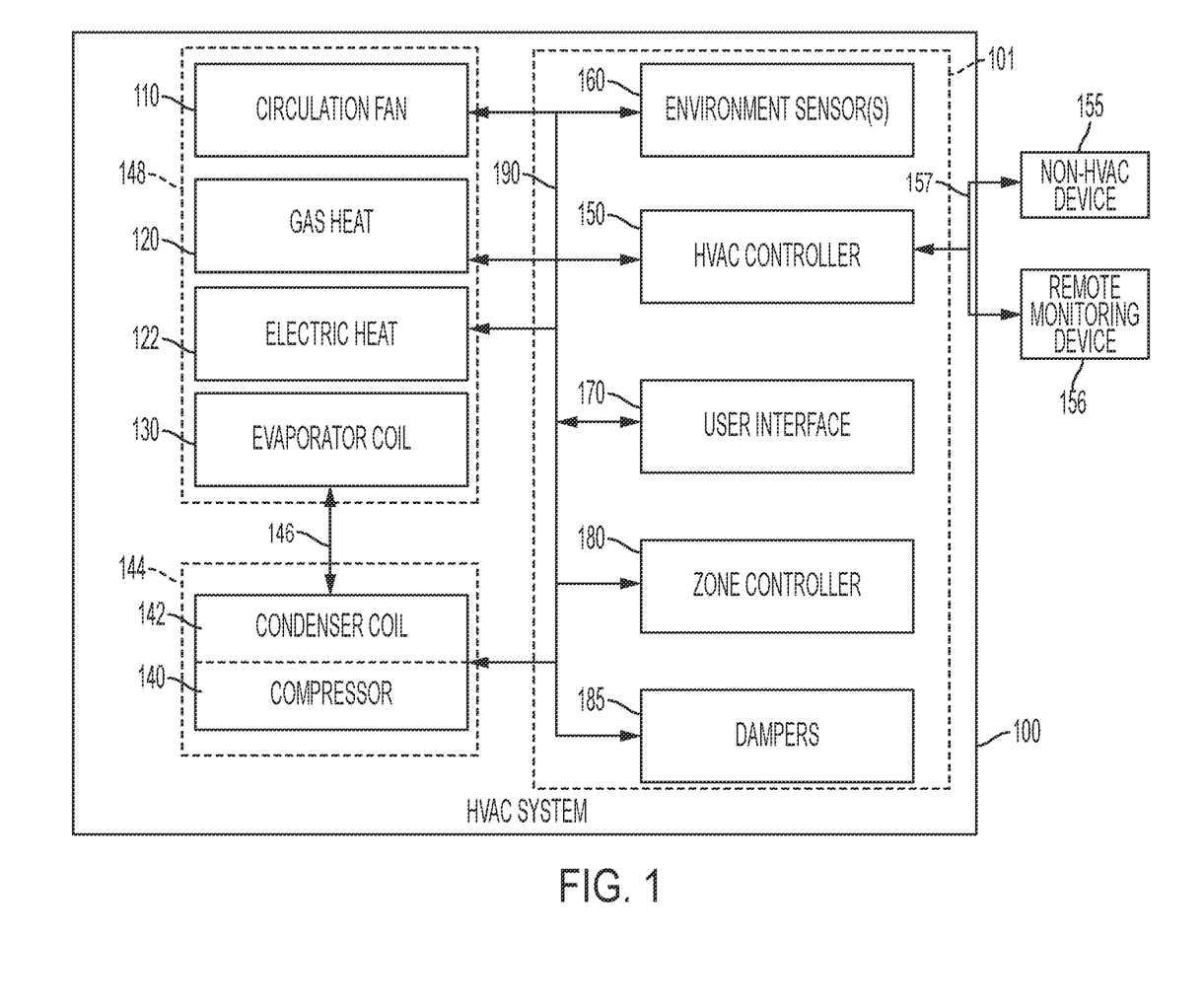
FIG. 1 is a block diagram of an exemplary HVAC system.

FIG. 1 illustrates an HVAC system 100. In a typical embodiment, the HVAC system 100 is a networked HVAC system that is configured to condition air via, for example, heating, cooling, humidifying, or dehumidifying air within an enclosed space 101. In a typical embodiment, the enclosed space 101 is, for example, a house, an office building, a warehouse, and the like. Thus, the HVAC system 100 can be a residential system or a commercial system such as, for example, a roof top system. For exemplary illustration, the HVAC system 100 as illustrated in FIG. 1 includes various components; however, in other embodiments, the HVAC system 100 may include additional components that are not illustrated but typically included within HVAC systems.

The HVAC system 100 includes a variable-speed circulation fan 110, a gas heat 120, electric heat 122 typically associated with the variable-speed circulation fan 110, and an evaporator coil 130, also typically associated with the variable-speed circulation fan 110. The variable-speed circulation fan 110, the gas heat 120, the electric heat 122, and the evaporator coil 130 are collectively referred to as an "indoor unit" 148. In a typical embodiment, the indoor unit 148 is located within, or in close proximity to, the enclosed space 101. The HVAC system 100 also includes a variable-speed compressor 140 and an associated condenser coil 142, which are typically referred to as an "outdoor unit" 144. In various embodiments, the outdoor unit 144 is, for example, a rooftop unit or a ground-level unit. The variable-speed compressor 140 and the associated condenser coil 142 are connected to an associated evaporator coil 130 by a refrigerant line 146. In a typical embodiment, the variable-speed compressor 140 is, for example, a single-stage compressor or a multi-stage compressor. The variable-speed circulation fan 110, sometimes referred to as a blower, is configured to operate at different capacities (i.e., variable motor speeds) to circulate air through the HVAC system 100, whereby the circulated air is conditioned and supplied to the enclosed space 101.

Still referring to FIG. 1, the HVAC system 100 includes an HVAC controller 150 that is configured to control operation of the various components of the HVAC system 100 such as, for example, the variable-speed circulation fan 110, the gas heat 120, the electric heat 122, and the variable-speed compressor 140 to regulate the environment of the enclosed space 101. In some embodiments, the HVAC system 100 can be a zoned system. In such embodiments, the HVAC system 100 includes a zone controller 180, dampers 185, and a plurality of environment sensors 160. In a typical embodiment, the HVAC controller 150 cooperates with the zone controller 180 and the dampers 185 to regulate the environment of the enclosed space 101.

The HVAC controller 150 may be an integrated controller or a distributed controller that directs operation of the HVAC system 100. In a typical embodiment, the HVAC controller 150 includes an interface to receive, for example, thermostat calls, temperature setpoints, blower control signals, environmental conditions, and operating mode status for various zones of the HVAC system 100. For example, in a typical embodiment, the environmental conditions may include indoor temperature and relative humidity of the enclosed space 101. In a typical embodiment, the HVAC controller 150 also includes a processor and a memory to direct operation of the HVAC system 100 including, for example, a speed of the variable-speed circulation fan 110.

Still referring to FIG. 1, in some embodiments, the plurality of environment sensors 160 are associated with the HVAC controller 150 and also optionally associated with a user interface 170. The plurality of environment sensors 160 provide environmental information within a zone or zones of the enclosed space 101 such as, for example, temperature and humidity of the enclosed space 101 to the HVAC controller 150. The plurality of environment sensors 160 may also send the environmental information to a display of the user interface 170. In some embodiments, the user interface 170 provides additional functions such as, for example, operational, diagnostic, status message display, and a visual interface that allows at least one of an installer, a user, a support entity, and a service provider to perform actions with respect to the HVAC system 100. In some embodiments, the user interface 170 is, for example, a thermostat of the HVAC system 100. In other embodiments, the user interface 170 is associated with at least one sensor of the plurality of environment sensors 160 to determine the environmental condition information and communicate that information to the user. The user interface 170 may also include a display, buttons, a microphone, a speaker, or other components to communicate with the user. Additionally, the user interface 170 may include a processor and memory that is configured to receive user-determined parameters such as, for example, a relative humidity of the enclosed space 101, and calculate operational parameters of the HVAC system 100 as disclosed herein.

In a typical embodiment, the HVAC system 100 is configured to communicate with a plurality of devices such as, for example, a monitoring device 156, a communication device 155, and the like. In a typical embodiment, the monitoring device 156 is not part of the HVAC system. For example, the monitoring device 156 is a server or computer of a third party such as, for example, a manufacturer, a support entity, a service provider, and the like. In other embodiments, the monitoring device 156 is located at an office of, for example, the manufacturer, the support entity, the service provider, and the like.

In a typical embodiment, the communication device 155 is a non-HVAC device having a primary function that is not associated with HVAC systems. For example, non-HVAC devices include mobile-computing devices that are configured to interact with the HVAC system 100 to monitor and modify at least some of the operating parameters of the HVAC system 100. Mobile computing devices may be, for example, a personal computer (e.g., desktop or laptop), a tablet computer, a mobile device (e.g., smart phone), and the like. In a typical embodiment, the communication device 155 includes at least one processor, memory and a user interface, such as a display. One skilled in the art will also understand that the communication device 155 disclosed herein includes other components that are typically included in such devices including, for example, a power supply, a communications interface, and the like.

The zone controller 180 is configured to manage movement of conditioned air to designated zones of the enclosed space 101. Each of the designated zones include at least one conditioning or demand unit such as, for example, the gas heat 120 and at least one user interface 170 such as, for example, the thermostat. The zone-controlled HVAC system 100 allows the user to independently control the temperature in the designated zones. In a typical embodiment, the zone controller 180 operates electronic dampers 185 to control air flow to the zones of the enclosed space 101.

In some embodiments, a data bus 190, which in the illustrated embodiment is a serial bus, couples various components of the HVAC system 100 together such that data is communicated therebetween. In a typical embodiment, the data bus 190 may include, for example, any combination of hardware, software embedded in a computer readable medium, or encoded logic incorporated in hardware or otherwise stored (e.g., firmware) to couple components of the HVAC system 100 to each other. As an example and not by way of limitation, the data bus 190 may include an Accelerated Graphics Port (AGP) or other graphics bus, a Controller Area Network (CAN) bus, a front-side bus (FSB), a HYPERTRANSPORT (HT) interconnect, an INFINI-BAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus 190 may include any number, type, or configuration of data buses 190, where appropriate. In particular embodiments, one or more data buses 190 (which may each include an address bus and a data bus) may couple the HVAC controller 150 to other components of the HVAC system 100. In other embodiments, connections between various components of the HVAC system 100 are wired. For example, conventional cable and contacts may be used to couple the HVAC controller 150 to the various components. In some embodiments, a wireless connection is employed to provide at least some of the connections between components of the HVAC system such as, for example, a connection between the HVAC controller 150 and the variable-speed circulation fan 110 or the plurality of environment sensors 160.

Figure 2:
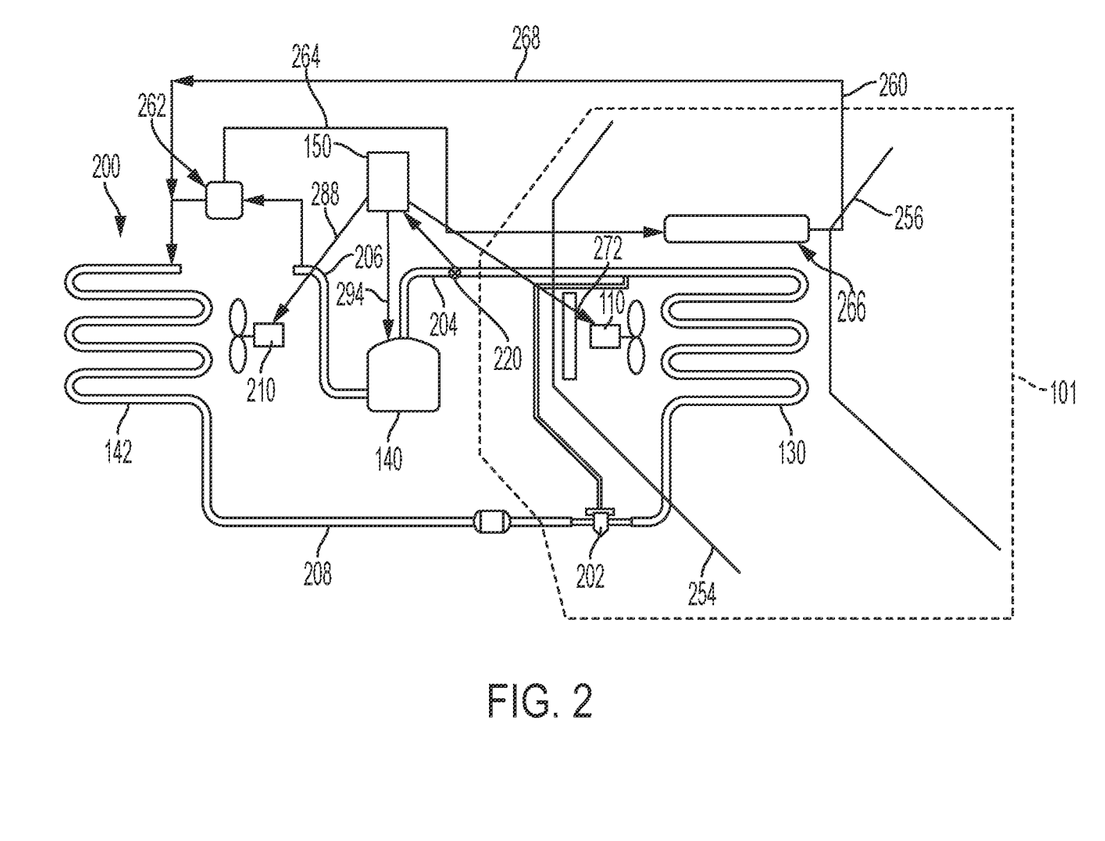
FIG. 2 is a schematic diagram of an exemplary HVAC system having a suction pressure sensor according to aspects of the disclosure.

FIG. 2 is a schematic diagram of the exemplary HVAC system 100 with a suction pressure sensor 220. For illustrative purposes, FIG. 2 will be described herein relative to FIG. 1. The HVAC system 100 includes the evaporator coil 130, the condenser coil 142, the variable-speed compressor 140, and a metering device 202. In a typical embodiment, the metering device 202 is, for example, a thermostatic expansion valve or a throttling valve. The evaporator coil 130 is fluidly coupled to the variable-speed compressor 140 via a suction line 204. The variable-speed compressor 140 is fluidly coupled to the condenser coil 142 via a discharge line 206. In a typical embodiment, the variable-speed compressor 140 is a variable-speed compressor. The condenser coil 142 is fluidly coupled to the metering device 202 via a liquid line 208.

Still referring to FIG. 2, during operation, low-pressure, low-temperature refrigerant is circulated through the evaporator coil 130. The refrigerant is initially in a liquid/vapor state. In a typical embodiment, the refrigerant is, for example, R-22, R-134a, R-410A, R-744, or any other suitable type of refrigerant as dictated by design requirements. Air from within the enclosed space 101, which is typically warmer than the refrigerant, is circulated around the evaporator coil 130 by the variable-speed circulation fan 110. In a typical embodiment, the refrigerant begins to boil after absorbing heat from the air and changes state to a low-pressure, low-temperature, super-heated vapor refrigerant. Saturated vapor, saturated liquid, and saturated fluid refer to a thermodynamic state where a liquid and its vapor exist in approximate equilibrium with each other. Super-heated fluid and super-heated vapor refer to a thermodynamic state where a vapor is heated above a saturation temperature of the vapor. Sub-cooled fluid and sub-cooled liquid refers to a thermodynamic state where a liquid is cooled below the saturation temperature of the liquid.

The low-pressure, low-temperature, super-heated vapor refrigerant is introduced into the variable-speed compressor 140 via the suction line 204. In a typical embodiment, the variable-speed compressor 140 increases the pressure of the low-pressure, low-temperature, super-heated vapor refrigerant and, by operation of the ideal gas law, also increases the temperature of the low-pressure, low-temperature, super-heated vapor refrigerant to form a high-pressure, high-temperature, superheated vapor refrigerant. The high-pressure, high-temperature, superheated vapor refrigerant leaves the variable-speed compressor 140 via the discharge line 206 and enters a three-way valve 262. When operating in a cooling mode, the three-way valve 262 directs that high-temperature, high-pressure, superheated vapor refrigerant to the condenser coil 142.

When operating in a dehumidification mode, the three-way valve 262 diverts at least a portion of the high-pressure, high-temperature, superheated vapor refrigerant into a re-heat feed line 264. The re-heat feed line 264 directs the high-pressure, high-temperature, superheated vapor refrigerant to a re-heat coil 266. In a typical embodiment, the re-heat coil 266 is positioned in a supply air duct 256 downwind from the evaporator coil 130. The re-heat coil 266 facilitates transfer of a portion of the heat stored in the high-pressure, high-temperature, superheated vapor refrigerant to air moving through the supply air duct 256 thereby heating the air in the supply air duct 256. If the high-pressure, high-temperature, superheated vapor refrigerant is warmer, more heat can be transferred to the air in the supply air duct 256 thereby causing a temperature of the air in the supply air duct 256 to be closer to a temperature of air in a return air duct 254. After leaving the re-heat coil 266, the high-pressure, high-temperature, superheated vapor refrigerant travels through a re-heat return line 268 and enters the condenser coil 142.

Outside air is circulated around the condenser coil 142 by a condenser fan 210. The outside air is typically cooler than the high-pressure, high-temperature, superheated vapor refrigerant present in the condenser coil 142. Thus, heat is transferred from the high-pressure, high-temperature, super-heated vapor refrigerant to the outside air. Removal of heat from the high-pressure, high-temperature, superheated vapor refrigerant causes the high-pressure, high-temperature, superheated vapor refrigerant to condense and change from a vapor state to a high-pressure, high-temperature, sub-cooled liquid state. The high-pressure, high-temperature, sub-cooled liquid refrigerant leaves the condenser coil 142 via the liquid line 208 and enters the metering device 202.

In the metering device 202, the pressure of the high-pressure, high-temperature, sub-cooled liquid refrigerant is abruptly reduced. In various embodiments where the metering device 202 is, for example, a thermostatic expansion valve, the metering device 202 reduces the pressure of the high-pressure, high-temperature, sub-cooled liquid refrigerant by regulating an amount of refrigerant that travels to the evaporator coil 130. Abrupt reduction of the pressure of the high-pressure, high-temperature, sub-cooled liquid refrigerant causes sudden, rapid, evaporation of a portion of the high-pressure, high-temperature, sub-cooled liquid refrigerant, commonly known as "flash evaporation." The flash evaporation lowers the temperature of the resulting liquid/vapor refrigerant mixture to a temperature lower than a temperature of the air in the enclosed space 101. The liquid/vapor refrigerant mixture leaves the metering device 202 and returns to the evaporator coil 130.

Still referring to FIG. 2, the HVAC controller 150 is operatively coupled to the variable-speed circulation fan 110 and to the variable-speed compressor 140. A pressure sensor 220 is arranged to measure refrigerant pressure within the suction line 204. In various embodiments, the pressure sensor 220 is, for example, a pressure transducer or other appropriate device. In various embodiments, a speed of the variable-speed compressor 140 may be adjusted to correspond to changing cooling loads. In such embodiments, the HVAC controller 150 may adjust a speed of the variable-speed circulation fan 110 relative to a speed of the variable-speed compressor 140. By way of example, in operation, a decrease in the speed of the variable-speed compressor 140 is detected by the HVAC controller 150. The HVAC controller 150 then signals the variable-speed circulation fan 110 to reduce speed. In certain conditions, however, reduction of the speed of the variable-speed circulation fan 110 is constrained by mechanical limitations of the variable-speed circulation fan 110. Additionally, low speeds of the variable-speed circulation fan can result in ineffective air distribution throughout the enclosed space 101.

Figure 3:
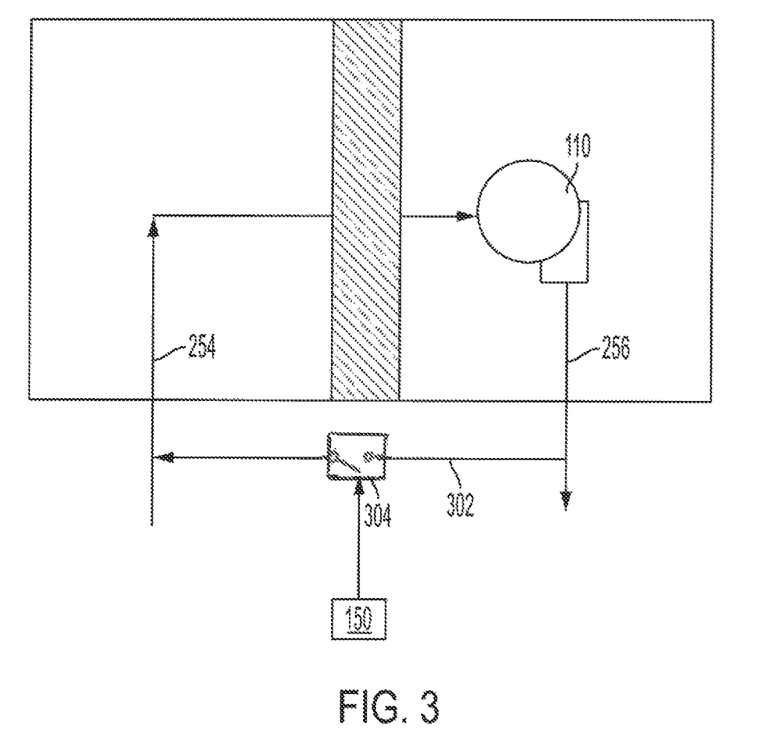
FIG. 3 is a schematic diagram of a re-circulation duct according to aspects of the disclosure.

FIG. 3 is a schematic diagram of a re-circulation duct 302. For illustrative purposes, FIG. 2 will be described herein relative to FIGS. 1-2. The re-circulation duct 302 is disposed so as to fluidly couple the supply air duct 256 to the return air duct 254. A damper 304 is disposed in the re-circulation duct 302. During operation, the damper 304 is movable between an open position, which allows air to pass from the supply air duct 256, through the re-circulation duct 302, to the return air duct 254, and a closed position, which does not allow passage of air through the re-circulation duct 302. In various embodiments, the damper 304 is electrically coupled to the HVAC controller 150 and moves between the open position and the closed position responsive to a signal from the HVAC controller 150.

Still referring to FIG. 3, during operation of the HVAC system 100, the pressure sensor 220 monitors refrigerant pressure in the suction line 204 (referred to herein as "suction pressure") and transmits a signal corresponding to the suction pressure to the HVAC controller 150. If the pressure sensor 220 detects a suction pressure in the suction line 204 above a pre-determined threshold, the HVAC controller 150 transmits a signal to the damper 304 directing the damper 304 to move from the closed position to the open position thereby allowing air to flow from the supply air duct 256 to the return air duct 254 via the re-circulation duct 302. In various embodiments, the pre-determined suction pressure threshold may be, for example, in the range of approximately 130 psi to approximately 150 psi when the HVAC system 100 is operating in the cooling mode and in the range of approximately 110 psi to approximately 130 psi when the HVAC system is operating in the dehumidification mode.

Still referring to FIG. 3, when the damper 304 is in the open position, a portion of air discharged from the variable-speed circulation fan 110 travels through the re-circulation duct 302 to the return air duct 254 and is not discharged to the enclosed space 101 via the supply air duct 256. Moving the damper 304 to the open position reduces a volume of air supplied to the enclosed space 101 and thus has an effect similar to that of reducing a speed of the variable-speed circulation fan 110. As used herein, the term "supply CFM" refers to a volume of air that is delivered to the enclosed space via the supply air duct 256. The term "blower CFM" refers to a volume of air supplied by the variable-speed circulation fan 110. The term "re-circulation CFM" refers to a volume of air that travels through the re-circulation duct 302. Thus the, blower CFM is the sum of the supply CFM and the re-circulation CFM.

Figure 4A:
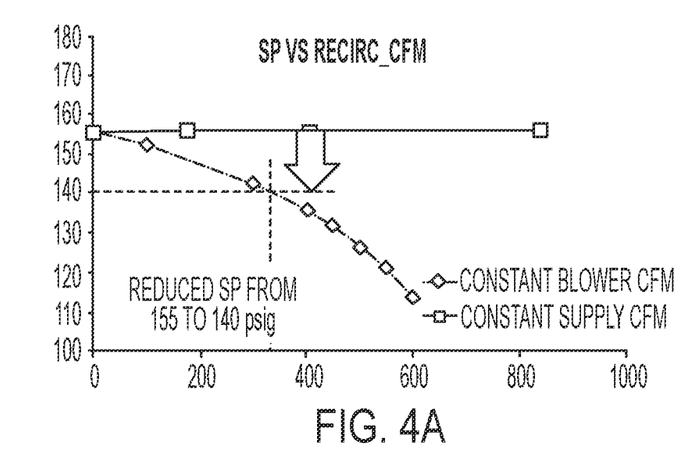
FIGS. 4A-4D are graphs illustrating various performance parameters of the HVAC system of FIG. 2 when the HVAC system is operating in the cooling mode according to aspects of the disclosure.
Figure 4B:
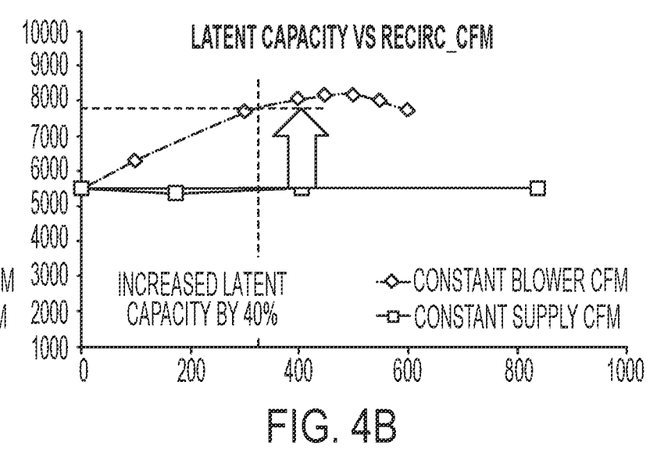
Figure 4C:
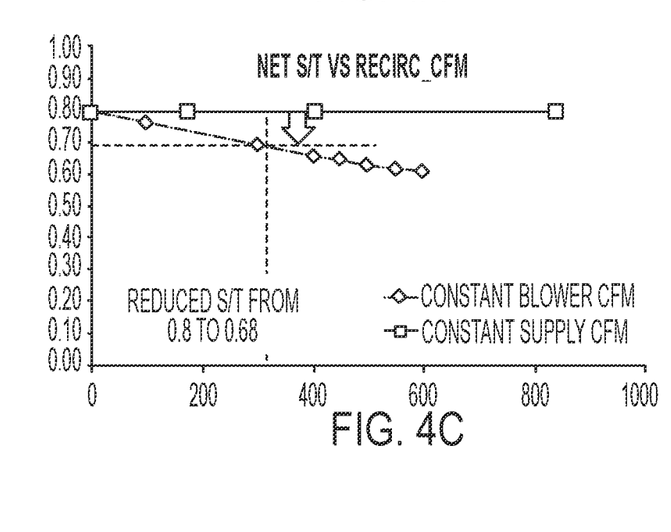
Figure 4D:
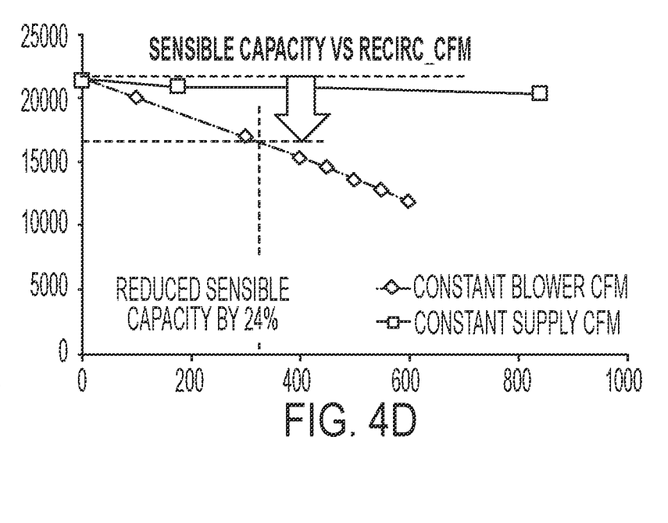

FIGS. 4A-4D are graphs illustrating various performance parameters of the HVAC system 100 when the HVAC system 100 is operating in the cooling mode. FIG. 4A is a graph of suction pressure versus re-circulation CFM. FIG. 4A illustrates that, as re-circulation CFM increases, and supply CFM thus decreases, suction pressure falls. FIG. 4B is a graph of latent capacity versus re-circulation CFM. FIG. 4B illustrates that, as re-circulation CFM increases, latent capacity increases. Thus, the ability of the HVAC system 100 to dehumidify air increases as the re-circulation CFM increases. FIG. 4C is a graph of S/T ratio versus re-circulation CFM. FIG. 4C illustrates that, as re-circulation CFM increases. S/T ratio decreases thereby indicating that the ability of the HVAC system 100 to dehumidify air increases as the re-circulation CFM increases. FIG. 4D is a graph of sensible capacity versus re-circulation CFM. FIG. 4D illustrates that, as re-circulation CFM increases, sensible capacity decreases thereby indicating that the ability of the HVAC system 100 to dehumidify air increases as the re-circulation CFM increases.

Figures 5A, 5C:
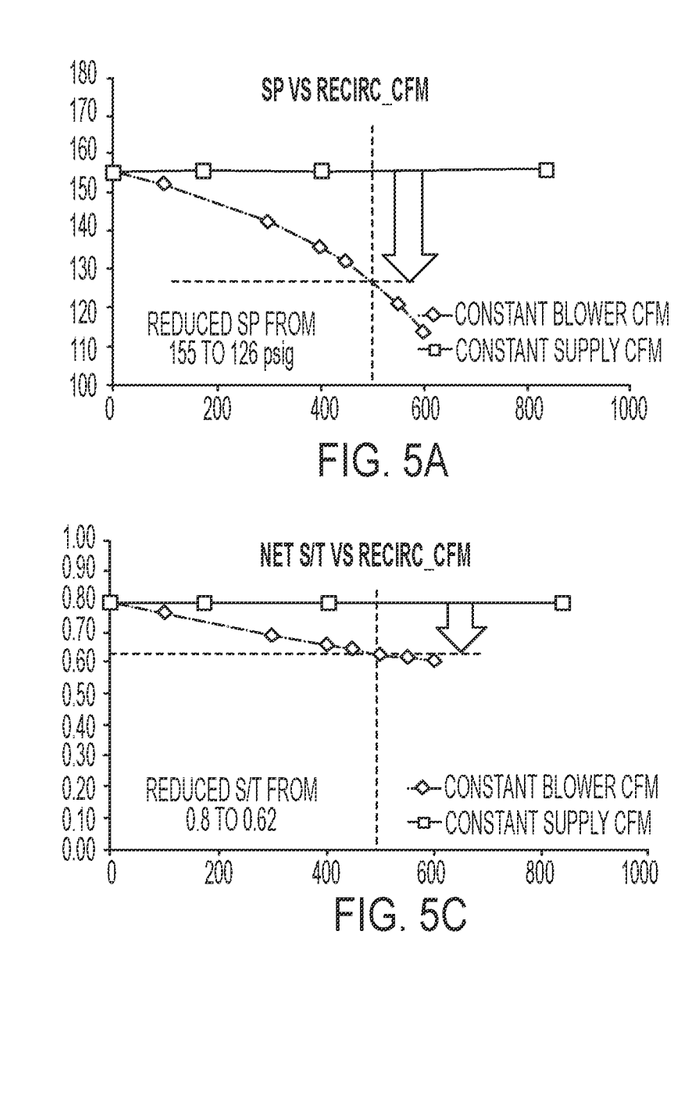
FIGS. 5A-5D are graphs illustrating various performance parameters of the HVAC system of FIG. 2 when the HVAC system is operating in the dehumidification mode according to aspects of the disclosure.
Figure 5B:
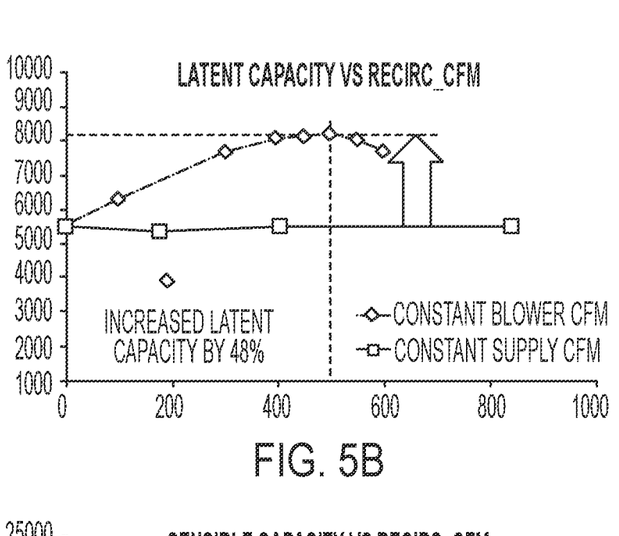
Figure 5D:
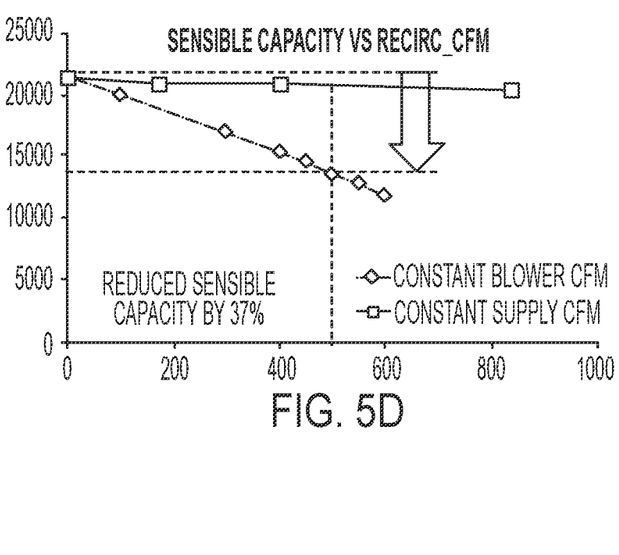

FIGS. 5A-5D are graphs illustrating various performance parameters of the HVAC system 100 when the HVAC system 100 is operating in the dehumidification mode. FIG. 5A is a graph of suction pressure versus re-circulation CFM. FIG. 5A illustrates that, as re-circulation CFM increases, and supply CFM thus decreases, suction pressure falls. FIG. 5B is a graph of latent capacity versus re-circulation CFM. FIG. 5B illustrates that, as re-circulation CFM increases, latent capacity increases. Thus, the ability of the HVAC system 100 to dehumidify air increases as the re-circulation CFM increases. FIG. 5C is a graph of S/T ratio versus re-circulation CFM. FIG. 5C illustrates that, as re-circulation CFM increases, S/T ratio decreases thereby indicating that the ability of the HVAC system 100 to dehumidify air increases as the re-circulation CFM increases. FIG. 5D is a graph of sensible capacity versus re-circulation CFM. FIG. 5D illustrates that, as re-circulation CFM increases, sensible capacity decreases thereby indicating that the ability of the HVAC system 100 to dehumidify air increases as the re-circulation CFM increases.

Figure 6:
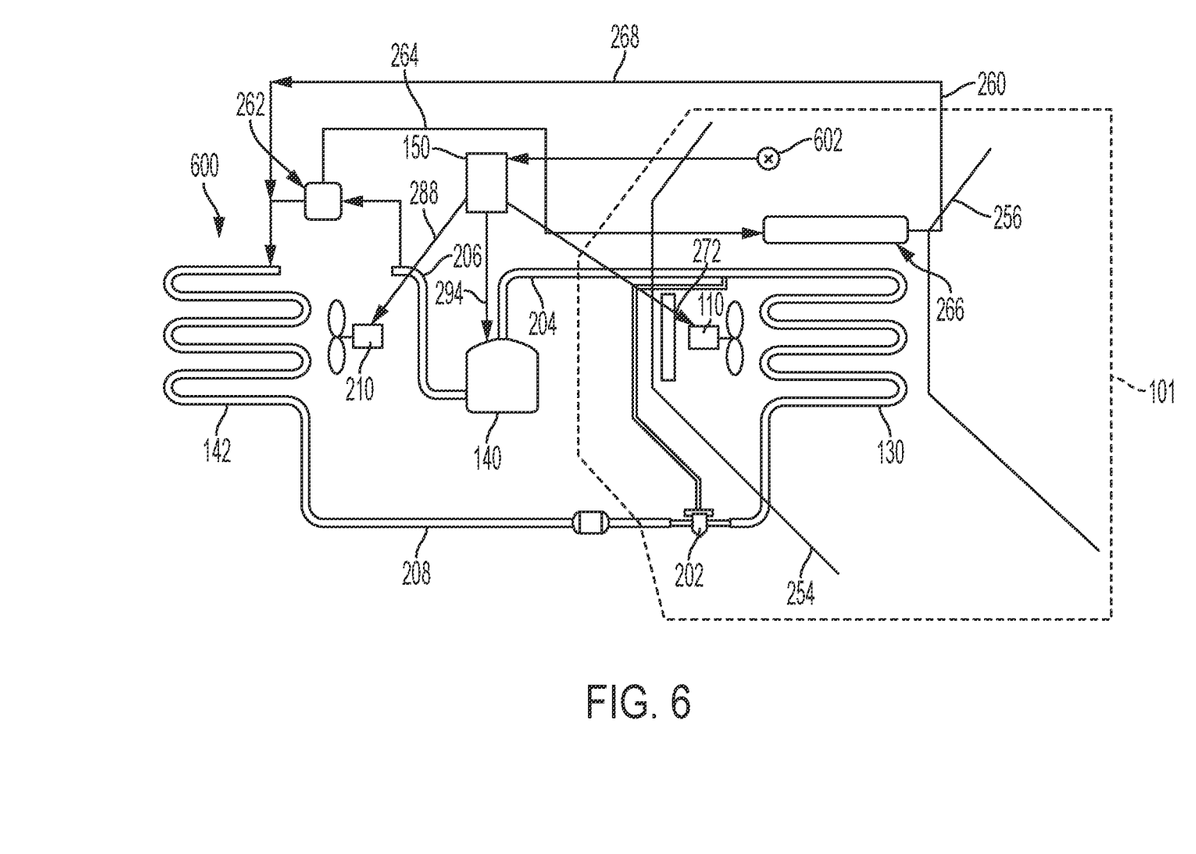
FIG. 6 is a schematic diagram of an exemplary HVAC system having a discharge air temperature sensor according to aspects of the disclosure.

FIG. 6 is a schematic diagram of an exemplary HVAC system 600 having a discharge air temperature sensor 602. For purposes of illustration, FIG. 6 will be described herein relative to FIGS. 1-3. The HVAC system 600 is similar in construction and operation to the HVAC system 100. The HVAC system 600, however, omits the pressure sensor 220. The temperature sensor 602 is positioned in the supply air duct 256 and thermally exposed to air entering the enclosed space 101 via the supply air duct 256. In various embodiments, the temperature sensor 602 is, for example, a thermometer, a thermocouple, a thermistor, or other appropriate device. In various embodiments, a speed of the variable-speed compressor 140 may be adjusted to correspond to changing cooling loads. The HVAC controller 150 adjusts a speed of the variable-speed circulation fan 110 relative to a speed of the variable-speed compressor 140.

Still referring to FIG. 6, during operation of the HVAC system 600, the temperature sensor 602 monitors temperature of air supplied to the enclosed space 101 via the supply air duct 256 (referred to herein as "discharge air temperature") and transmits a signal corresponding to the suction pressure to the HVAC controller 150. If the temperature sensor 602 detects a discharge air temperature above a pre-determined threshold, the HVAC controller 150 transmits a signal to the damper 304 directing the damper 304 to move from the closed position to the open position thereby allowing air to flow from the supply air duct 256 to the return air duct 254 via the re-circulation duct 302. In various embodiments, the pre-determined discharge air temperature threshold may be, for example, in the range of approximately 45 F to approximately 65 F when the HVAC system 600 is operating in the cooling mode and in the range of approximately 40 F to approximately 60 F when the HVAC system 600 is operating in the dehumidification mode.

Still referring to FIG. 6, when the damper 304 is in the open position, a portion of air discharged from the variable-speed circulation fan 110 travels through the re-circulation duct 302 to the return air duct 254 and is not discharged to the enclosed space 101 via the supply air duct 256. Moving the damper 304 to the open position reduces a volume of air supplied to the enclosed space 101 and thus has an effect similar to that of reducing a speed of the variable-speed circulation fan 110.

Figure 7A:
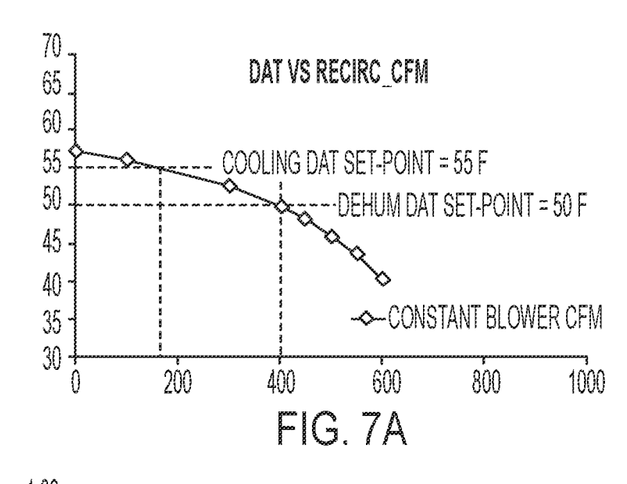
FIG. 7A-7D are graphs illustrating various performance parameters of the HVAC system of FIG. 6 according to aspects of the disclosure.
Figure 7B:
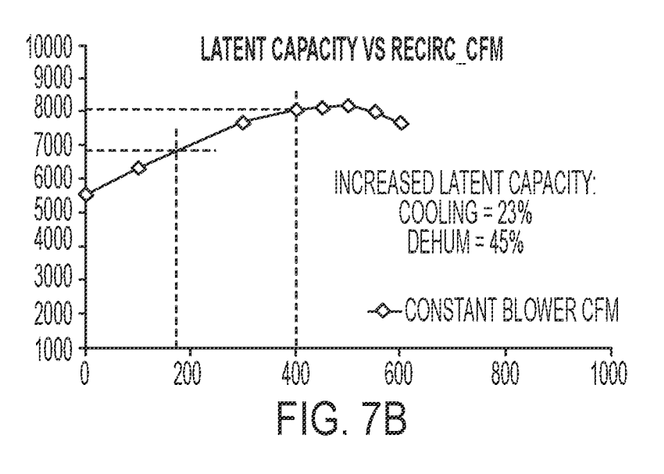
Figure 7C:
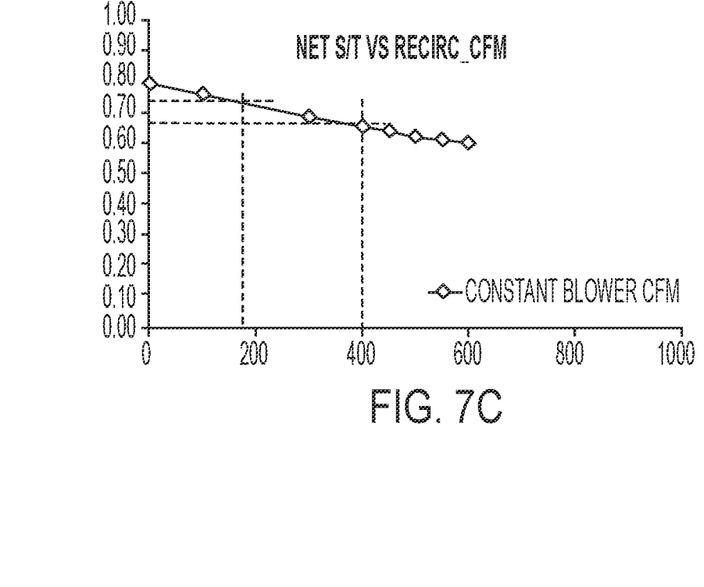
Figure 7D:
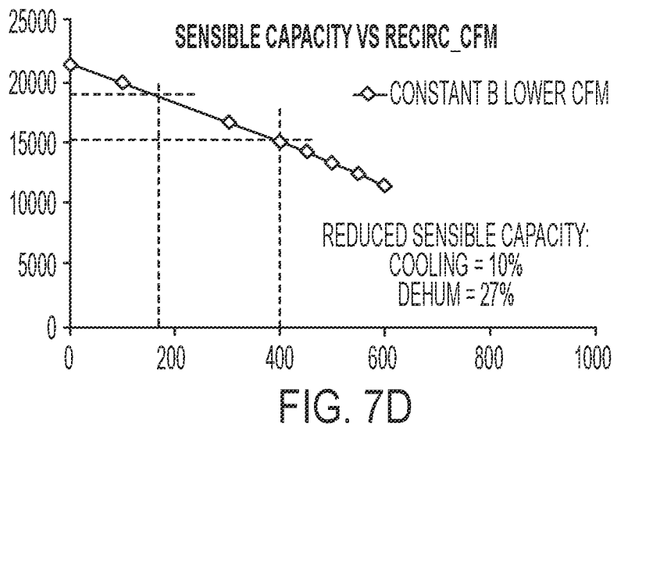

FIG. 7A-7D are tables illustrating performance of the exemplary HVAC system 600. FIG. 7A is a graph of discharge air temperature versus re-circulation CFM. FIG. 5A illustrates that, as re-circulation CFM increases, and supply CFM thus decreases, discharge air temperature falls. FIG. 7B is a graph of latent capacity versus re-circulation CFM. FIG. 7B illustrates that, as re-circulation CFM increases, latent capacity increases. Thus, the ability of the HVAC system 600 to dehumidify air increases as the re-circulation CFM increases. FIG. 7C is a graph of S/T ratio versus re-circulation CFM. FIG. 7C illustrates that, as re-circulation CFM increases, S/T ratio decreases thereby indicating that the ability of the HVAC system 600 to dehumidify air increases as the re-circulation CFM increases. FIG. 7D is a graph of sensible capacity versus re-circulation CFM. FIG. 7D illustrates that, as re-circulation CFM increases, sensible capacity decreases thereby indicating that the ability of the HVAC system 600 to dehumidify air increases as the re-circulation CFM increases.

Figure 8:
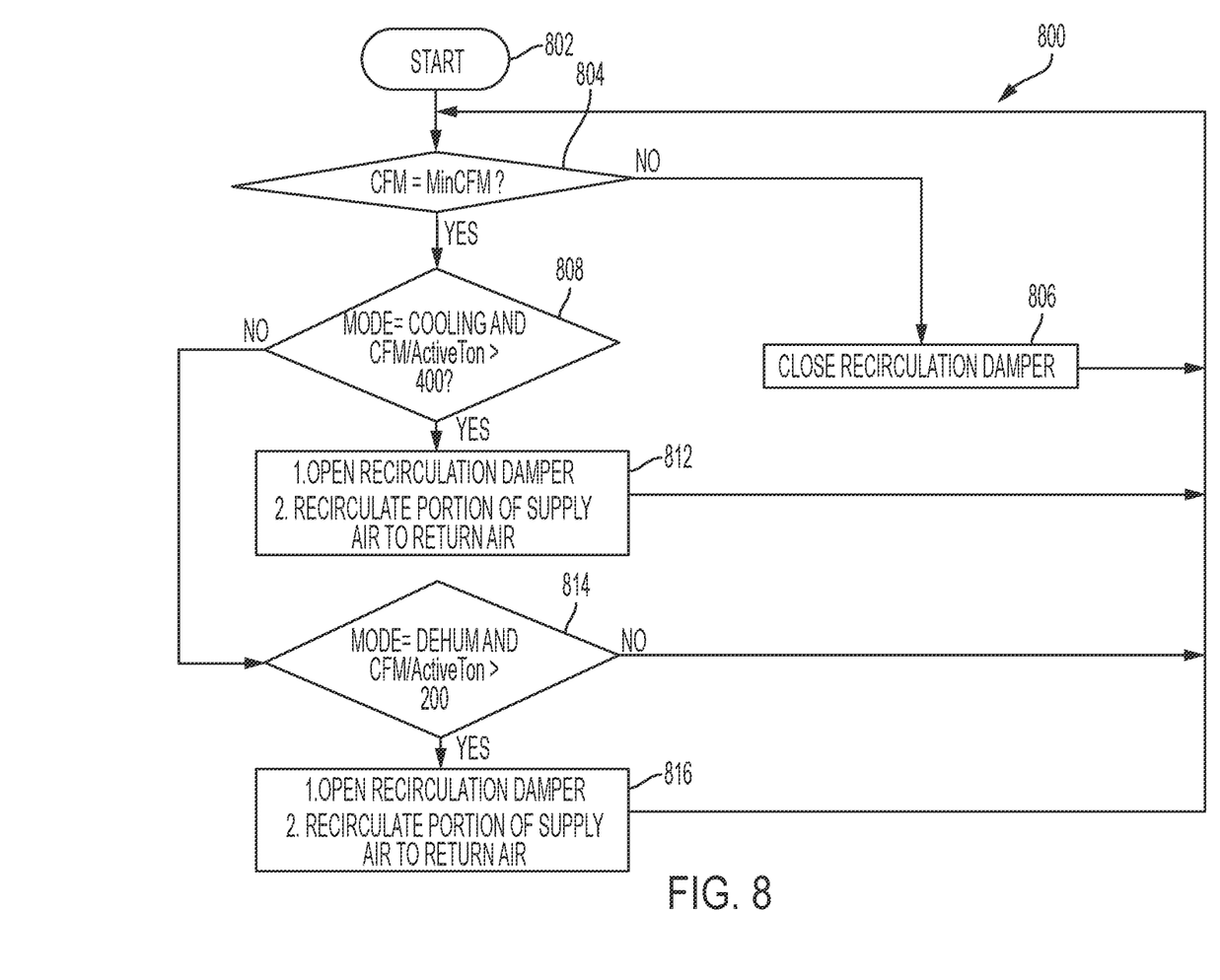
FIG. 8 is a flow diagram of a process for utilizing a re-circulation duct according to aspects of the disclosure.

FIG. 8 is a flow diagram of a process 800 for utilizing a re-circulation duct 302. The process 800 starts at step 802. At step 804, a determination is made if the speed of the variable-speed circulation fan 110 is operating at a minimum rated speed. In various embodiments, a minimum rated speed of the variable-speed circulation fan 110 is established by a manufacturer of the variable-speed circulation fan 110. If it is determined at step 804 that the variable-speed circulation fan 110 is not operating at a minimum rated speed, the process 800 proceeds to step 806. At step 806, the damper 304 is closed. If it is determined at step 804 that the variable-speed circulation fan 110 is operating at a minimum rated speed, the process 800 proceeds to step 808. At step 808, a determination if the HVAC system is operating in cooling mode and if the ratio of CFM per actual ton is greater than 400. As illustrated in FIGS. 2 and 6, an operating parameter of the HVAC system such as, for example, the suction pressure or the discharge air temperature may be utilized as a proxy for CFM per actual ton ratio. If, at step 808, it is determined that the HVAC system is operating in cooling mode and the ratio of CFM per actual ton is greater than 400, the process 800 proceed to step 812. At step 812, the damper 304 is opened in an effort increase the latent capacity of the HVAC system. From step 812, the process returns to step 804.

Still referring to FIG. 8, if, at step 808 it is determined that the HVAC system is either 1) not operating in cooling mode; or 2) the CFM per actual ton ratio is not greater than 400, the process 800 proceeds to step 814. At step 814, a determination is made if the HVAC system is operating in dehumidification mode and if the CFM per actual ton ratio is greater than 200. If, at step 814, it is determined that the HVAC system is operating in dehumidification mode and the CFM per actual ton ratio is greater than 200, the process 800 proceeds to step 816. At step 816, the damper 304 is opened in an effort increase the latent capacity of the HVAC system. From step 816, the process returns to step 804. If, at step 814 it is determined that the HVAC system is either 1) not operating in dehumidification mode; or 2) the CFM per actual ton ratio is not greater than 200, the process 800 returns to step 804. In various embodiments, hysteresis may be incorporated with at least one of steps 806, 812, and 816 in order to prevent repeated opening and closing of the damper 304.

For purposes of this patent application, the term computer-readable storage medium encompasses one or more tangible computer-readable storage media possessing structures. As an example and not by way of limitation, a computer-readable storage medium may include a semiconductor-based or other integrated circuit (IC) (such as, for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of the HVAC controller 150, one or more portions of the user interface 170, one or more portions of the zone controller 180, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

In this patent application, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Python, Java, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately." "generally," and "about" may be substituted with "within 10% of" what is specified.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A heating, ventilation, and air conditioning (HVAC) system comprising:
   an evaporator coil disposed between a supply air duct and a return air duct;
   a re-circulation duct that couples the supply air duct and the return air duct;
   a controller operatively coupled to a variable-speed compressor, a variable-speed circulation fan, and a damper, wherein the damper is disposed in the re-circulation duct and is moveable between an open position and a closed position;
   wherein the controller is configured to:
      determine if the variable-speed circulation fan is operating at a minimum speed;
      monitor an operating parameter of the HVAC system;
      determine if the operating parameter of the HVAC system exceeds a pre-determined threshold;
      responsive to a determination that the variable-speed circulation fan is not operating at the minimum speed or the operating parameter is below the pre-determined threshold, signal the damper to move to the closed position; and
      wherein the operating parameter is a refrigerant pressure in a suction line.

2. The HVAC system of claim 1, wherein:
   the variable-speed circulation fan circulates air around the evaporator coil; and
   the variable-speed compressor is fluidly coupled to the evaporator coil.

3. The HVAC system of claim 1 comprising:
   a pressure sensor disposed in the suction line between the evaporator coil and the variable-speed compressor, the pressure sensor being configured to measure the operating parameter.

4. The HVAC system of claim 1, wherein the controller is configured to:
   responsive to a determination that the variable-speed circulation fan is operating at the minimum speed and the operating parameter exceeds the pre-determined threshold, signal the damper to move to the open position.

5. The HVAC system of claim 4, wherein, in the open position, air from the supply air duct is diverted to the return air duct via the re-circulation duct.

6. The HVAC system of claim 4, wherein moving the damper to the open position reduces a volume of air supplied via the supply air duct.

7. The HVAC system of claim 4, wherein moving the damper to the open position increases latent capacity of the HVAC system.

8. The HVAC system of claim 1, wherein a speed of the variable-speed circulation fan is modulated responsive to a speed of the variable-speed compressor.

9. The HVAC system of claim 1, wherein the HVAC system operates in at least one of a cooling mode and a dehumidification mode.

10. The HVAC system of claim 9, wherein:
    the pre-determined threshold is in the range of approximately 130 psi to approximately 150 psi when the HVAC system is operating in the cooling mode; and
    the pre-determined threshold is in the range of approximately 110 psi to approximately 130 psi when the HVAC system is operating in the dehumidification mode.

11. A method of utilizing a re-circulation duct, the method comprising:
    determining with a heating, ventilation, and air conditioning (HVAC) controller if a variable-speed circulation fan is operating at a minimum speed;
    monitoring an operating parameter of an HVAC system;
    determining if the operating parameter of the HVAC system exceeds a pre-determined threshold;
    responsive to a determination that the variable-speed circulation fan is operating at the minimum speed and the operating parameter exceeds the pre-determined threshold, signaling a damper disposed in a re-circulation duct that fluidly couples a supply air duct and a return air duct to move to an open position;
    responsive to a determination that the variable-speed circulation fan is not operating at the minimum speed or the operating parameter is below the pre-determined threshold, signaling the damper to move to a closed position; and
    wherein the operating parameter is a refrigerant pressure in a suction line.

12. The method of claim 11, wherein the monitoring the operating parameter includes monitoring the refrigerant pressure in the suction line with a pressure sensor.

13. The method of claim 11, comprising diverting air from the supply air duct to the return air duct via the re-circulation duct responsive to opening the damper.

14. The method of claim 11, wherein moving the damper to the open position reduces a volume of air supplied via the supply air duct.

15. The method of claim 11, wherein the HVAC system operates in at least one of a cooling mode and a dehumidification mode.

16. The method of claim 15, wherein:
    the pre-determined threshold is in the range of approximately 130 psi to approximately 150 psi when the HVAC system is operating in the cooling mode; and
    the pre-determined threshold is in the range of approximately 110 psi to approximately 130 psi when the HVAC system is operating in the dehumidification mode.

17. The method of claim 11, wherein moving the damper to the open position increases latent capacity of the HVAC system.

18. A heating, ventilation, and air conditioning (HVAC) system comprising:
    a controller operatively coupled to a variable-speed compressor, a variable-speed circulation fan, and a damper disposed in a re-circulation duct, wherein the damper is moveable between an open position and a closed position;

wherein the controller is configured to:
determine if the variable-speed circulation fan is operating at a minimum speed and if a suction pressure measured by a pressure sensor disposed in a suction line is above a pre-determined threshold; and
responsive to a determination that the variable-speed circulation fan is operating at the minimum speed and the suction pressure is above the pre-determined threshold, signal the damper to move to the open position to increase latent capacity of the HVAC system.

19. The HVAC system of claim 18, wherein, responsive to a determination that the variable-speed circulation fan is not operating at the minimum speed or the suction pressure is below the pre-determined threshold, signal the damper to move to the closed position.

20. The HVAC system of claim 18, wherein the HVAC system operates in at least one of a cooling mode and a dehumidification mode.

\* \* \* \* \*